(12) United States Patent
Aoyama et al.

(10) Patent No.: US 11,199,135 B2
(45) Date of Patent: Dec. 14, 2021

(54) GAS TURBINE SYSTEM

(71) Applicant: MITSUBISHI HEAVY INDUSTRIES, LTD., Tokyo (JP)

(72) Inventors: Kuniaki Aoyama, Tokyo (JP); Jo Masutani, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 66 days.

(21) Appl. No.: 16/376,054

(22) Filed: Apr. 5, 2019

(65) Prior Publication Data

US 2019/0323432 A1    Oct. 24, 2019

(30) Foreign Application Priority Data

Apr. 18, 2018  (JP) .............................. JP2018-080140

(51) Int. Cl.

| | |
|---|---|
| *F02C 7/00* | (2006.01) |
| *F02C 7/18* | (2006.01) |
| *F02C 6/06* | (2006.01) |
| *F02C 9/18* | (2006.01) |
| *F02C 7/28* | (2006.01) |

(52) U.S. Cl.
CPC ................ *F02C 7/185* (2013.01); *F02C 6/06* (2013.01); *F02C 9/18* (2013.01); *F02C 7/28* (2013.01); *F05D 2240/12* (2013.01)

(58) Field of Classification Search
CPC .......... F01D 5/085; F01D 5/187; F01D 5/182; F01D 5/18; F01D 11/24; F01D 9/06; F02C 7/185; F02C 7/28; F02C 7/12; F02C 9/18; F05D 2240/12
See application file for complete search history.

(56) References Cited

U.S. PATENT DOCUMENTS 3,936,215 A * 2/1976 Hoff ........................ F01D 5/081
                                                                     415/115
5,163,285 A * 11/1992 Mazeaud ................ F02C 7/185
                                                                       60/806

(Continued)

FOREIGN PATENT DOCUMENTS

| DE | 44 11 616 | 10/1995 |
|---|---|---|
| DE | 196 29 191 | 1/1998 |

(Continued)

*Primary Examiner* — Edwin Kang
(74) *Attorney, Agent, or Firm* — Wenderoth, Lind & Ponack, L.L.P.

(57) ABSTRACT

A turbine-cooling system of a gas turbine system includes a first intra-vane flow passage defined in a first stator vane so as to penetrate the first stator vane in a radial direction, a second intra-vane flow passage defined in a second stator vane so as to penetrate the second stator vane in the radial direction, an intra-rotation-shaft flow passage connecting the first intra-vane flow passage and the second intra-vane flow passage in a rotation shaft, an extra-turbine flow passage connecting the first intra-vane flow passage and the second intra-vane flow passage, a boost compressor configured to make cooling air flow sequentially through the first intra-vane flow passage, the intra-rotation-shaft flow passage, the second intra-vane flow passage, and the extra-turbine flow passage, and a cooling unit configured to cool the cooling air.

5 Claims, 6 Drawing Sheets

(56) References Cited

U.S. PATENT DOCUMENTS

| | | | | |
|---|---|---|---|---|
| 5,232,335 | A | * | 8/1993 | Narayana ............... F01D 5/081 |
| | | | | 415/115 |
| 5,525,032 | A | * | 6/1996 | Kreis ..................... F01D 5/085 |
| | | | | 415/1 |
| 6,065,282 | A | * | 5/2000 | Fukue .................... F02C 7/185 |
| | | | | 415/115 |
| 8,668,437 | B1 | * | 3/2014 | Liang ....................... F01D 5/14 |
| | | | | 415/115 |
| 2004/0148943 | A1 | | 8/2004 | Laurello et al. |
| 2015/0275769 | A1 | * | 10/2015 | Foutch ..................... F02C 7/27 |
| | | | | 60/776 |
| 2015/0377054 | A1 | | 12/2015 | Mizukami et al. |
| 2016/0195018 | A1 | * | 7/2016 | Brostmeyer .............. F02C 7/18 |
| | | | | 60/39.83 |
| 2018/0209299 | A1 | * | 7/2018 | Johnson ............... F01D 11/001 |

FOREIGN PATENT DOCUMENTS

| | | |
|---|---|---|
| JP | 5-86901 | 4/1993 |
| JP | 2004-239254 | 8/2004 |
| JP | 2017-198078 | 11/2017 |
| JP | 2018-96329 | 6/2018 |

\* cited by examiner

GAS TURBINE SYSTEM

CROSS-REFERENCE TO RELATED APPLICATION

Priority is claimed from Japanese Patent Application No. 2018-80140, filed Apr. 18, 2018, the content of which is incorporated herein by reference.

FIELD OF THE INVENTION

The present invention relates to a gas turbine system.

RELATED ART

A gas turbine includes a compressor generating high-pressure air, a combustor generating high-temperature and high-pressure combustion gas by combusting a gas mixture of high-pressure air and fuel, and a turbine that is driven by the combustion gas. In the gas turbine, efficiency can be improved as the temperature of the combustion gas at a turbine inlet (a turbine inlet temperature) increases. Recently, in order to achieve improvement in efficiency, additional increase of the turbine inlet temperature has progressed. In addition, it is necessary to further enhance cooling capability for the turbine. Specifically, techniques of efficiently cooling a rotor blade or a stator vane in the turbine are required.

As such a technique for cooling a turbine, for example, a gas turbine described in Japanese Unexamined Patent Application, First Publication No. H5-86901 is known. The gas turbine includes an air booster that is provided coaxially with a rotation shaft (an axle). The air booster boosts the pressure of air discharged and supplied from an outlet of a compressor and feeds the boosted air as cooling air into a stator vane and a rotor blade of the turbine.

In order to improve efficiency of the turbine, it is necessary to curb leakage of combustion gas from a clearance between an end surface on an inner circumference side of a stator vane and an outer circumferential surface of a rotation shaft and a clearance between an end surface on an outer circumference side of a rotor blade and an inner circumferential surface of a casing. In order to decrease leakage of combustion gas, a sealing device such as a labyrinth seal is provided in the clearances.

SUMMARY OF THE INVENTION

Here, air discharged from a compressor has a much higher pressure than combustion gas in a turbine. When the discharged air is used as cooling air for the turbine, a pressure difference between the cooling air and the combustion gas increases. Accordingly, an amount of cooling air leaking from the clearances (the sealing device) increases. As a result, efficiency of the turbine may decrease.

The invention is made to solve the above-mentioned problem and an objective thereof is to provide a gas turbine system that can curb a decrease in efficiency and cool a turbine.

Solution to Problem

According to a first aspect of the invention, a gas turbine system includes: a turbine which is provided with a rotation shaft configured to rotate around an axis, a rotor blade stage including a plurality of rotor blades which are arranged on an outer circumference of the rotation shaft with intervals in a circumferential direction thereof, a casing surrounding the rotation shaft and the plurality of rotor blades, and a vane stage including a plurality of stator vanes which are fixed to the casing and are arranged with intervals in the circumferential direction; and a turbine cooling system configured to cool the turbine with cooling air, wherein the turbine-cooling system includes a first intra-vane flow passage that is formed in the stator vane so as to penetrate the stator vane in a radial direction of the rotation shaft, a second intra-vane flow passage that is formed in the stator vane so as to penetrate the stator vane in the radial direction, an intra-rotation-shaft flow passage that is formed in the rotation shaft and connects inner ends in the radial direction of the first intra-vane flow passage and the second intra-vane flow passage, and an extra-turbine flow passage connecting an outer end in the radial direction of the first intra-vane flow passage and an outer end in the radial direction of the second intra-vane flow passage.

According to this configuration, the stator vanes are cooled by allowing cooling air to flow through the first intra-vane flow passage and the second intra-vane flow passage.

According to a second aspect of the invention, the turbine-cooling system may further include: a boost compressor configured to make the cooling air flow sequentially through the first intra-vane flow passage, the intra-rotation-shaft flow passage, the second intra-vane flow passage, and the extra-turbine flow passage; and a cooling unit that is provided in the extra-turbine flow passage and configured to cool the cooling air.

According to this configuration, the cooling air is circulated in the first intra-vane flow passage, the intra-rotation-shaft flow passage, the second intra-vane flow passage, and the extra-turbine flow passage by the boost compressor. Accordingly, by appropriately setting a compression ratio of the boost compressor, it is possible to suppress a pressure difference between the cooling air and the combustion gas. As a result, it is possible to curb leakage of the cooling air into the combustion gas.

According to a third aspect of the invention, the turbine may include a plurality of the stator vane stages that are arranged in a main flow direction parallel to the axis, wherein the first intra-vane flow passage may be formed in one of the plurality of the stator vane stages, and the second intra-vane flow passage may be formed in another of the plurality of the stator vane stages.

According to this configuration, the first intra-vane flow passage and the second intra-vane flow passage are formed in different stator vanes. Accordingly, it is possible to cool more stator vane stages using a single turbine-cooling system. As a result, since the number of components and the number of assembly processes in the gas turbine system are reduced, it is possible to achieve a decrease in cost.

According to a fourth aspect of the invention, the first intra-vane flow passage may be formed in the stator vane stage downstream in the main flow direction from the stator vane stage in which the second intra-vane flow passage is formed, and the boost compressor may be installed between the intra-rotation-shaft flow passage and the second intra-vane flow passage.

Here, the pressure of the combustion gas decreases gradually from upstream to downstream in the main flow direction in the turbine. In the above-mentioned configuration, the first intra-vane flow passage is formed in the downstream stator vane stage with a relatively low pressure, and the second intra-vane flow passage is formed in the upstream stator vane stage with a relatively high pressure. The boost compressor is provided between the intra-rotation-shaft flow passage and the second intra-vane flow passage, that is, downstream from the first intra-vane flow passage. Accordingly, cooling air with a relatively low pressure can be supplied to the first intra-vane flow passage and cooling air with a relatively high pressure which has been boosted by the boost compressor can be supplied to the second intra-vane flow passage. As a result, it is possible to decrease the pressure difference between the main flow (the combustion gas) and the cooling air in both the first intra-vane flow passage and the second intra-vane flow passage and to further reduce the likelihood that the cooling air will leak to the main flow.

On the other hand, for example, when the first intra-vane flow passage is formed in the stator vane stage upstream from the second intra-vane flow passage, it is necessary to supply cooling air with a higher pressure than the main flow (the combustion gas) to the first intra-vane flow passage in order to prevent a back flow of the main flow into the first intra-vane flow passage. The cooling air with a high pressure is supplied to the second intra-vane flow passage. As a result, there is the likelihood that cooling air will leak to the main flow from the second intra-vane flow passage and thermal efficiency of the turbine will decrease. Since the cooling air having increased in temperature at the time of cooling an upstream stator vane stage is supplied to a downstream stator vane stage with a relatively low temperature, there is concern that a cooling effect will also decrease. However, according to the above-mentioned configuration, this situation can be avoided.

According to a fifth aspect of the invention, the boost compressor may include: a disk-shaped impeller disk that is provided integrally with the rotation shaft and is centered on the axis; a plurality of blades that are arranged radially centered on the axis on a surface of the impeller disk facing the axis direction; and an impeller cover covering the blades thereby forming an impeller flow passage between the impeller disk and the impeller cover. An inlet of the impeller flow passage may be open to an outlet of the intra-rotation-shaft flow passage and an outlet of the impeller flow passage may be open to an inlet of the second intra-vane flow passage.

According to this configuration, since the boost compressor is provided integrally with the rotation shaft, it is possible to save space for device installation, for example, in comparison with a case in which the boost compressor is provided on the outside independently from the turbine. Since the boost compressor Is driven coaxially with the turbine, power required for driving the boost compressor can also be reduced. The boost compressor boosts the pressure of cooling air supplied from the outlet of the intra-rotation-shaft flow passage and supplies the boosted cooling air to the second intra-vane flow passage. Here, the cooling air supplied from the intra-rotation-shaft flow passage decreases in pressure at the time of flowing through the first intra-vane flow passage. However, according to the above-mentioned configuration, the cooling air can be supplied to the second intra-vane flow passage in a state in which the pressure of the cooling air has been boosted by the boost compressor. That is, it is possible to promote flowing of the cooling air in the second intra-vane flow passage.

According to a sixth aspect of the invention, the turbine may include a plurality of stator vane stages that are arranged in the main flow direction parallel to the axis, wherein the first intra-vane flow passage may be formed in one of the plurality of the stator vane stages, and the second intra-vane flow passage may be formed in the same of the plurality of the stator vane stages.

According to this configuration, since the first intra-vane flow passage and the second intra-vane flow passage are formed in the same stator vane stage, it is possible to decrease the pressure required for allowing the cooling air to flow from the first intra-vane flow passage to the second intra-vane flow passage, for example, in comparison with a case in which the flow passages are formed in different stator vane stages. That is, since the compression ratio of the boost compressor can be decreased, it is possible to reduce power required for driving the boost compressor. Since the compression ratio of the boost compressor is decreased, the pressure difference between the cooling air and the main flow (the combustion gas) further decreases. Accordingly, it is possible to reduce the likelihood that the cooling air will leak to the main flow.

By cooling the same stator vane stage using two flow passages (the first intra-vane flow passage and the second intra-vane flow passage), it is possible to decrease a cooling load for each flow passage. Particularly, by decreasing the cooling load of the first intra-vane flow passage, for example, a part of the cooling air flowing through the first intra-vane flow passage can be extracted and be used for cooling other constituent members. That Is, it is possible to cool a wider range in the turbine.

According to a seventh aspect of the invention, the boost compressor may include: a disk-shaped impeller disk that is provided integrally with the rotation shaft and is centered on the axis; a plurality of blades that are arranged radially centered on the axis on a surface of the impeller disk facing the axis direction; and an impeller cover covering the blades thereby forming an impeller flow passage serving as the intra-rotation-shaft flow passage between the impeller disk and the impeller cover.

According to this configuration, since the boost compressor is provided integrally with the rotation shaft, it is possible to save space for device installation, for example, in comparison with a case in which the boost compressor is provided on the outside independently from the turbine. Since the boost compressor is driven coaxially with the turbine, power required for driving the boost compressor can also be reduced. The boost compressor can boost the pressure of the cooling air which has relatively decreased in pressure while passing through the first intra-vane flow passage and supply the boosted cooling air to the second intra-vane flow passage. Accordingly, it is possible to promote flowing of the cooling air in the second intra-vane flow passage.

According to an eighth aspect of the invention, an intra-rotor-blade flow passage may be formed in the rotor blade so as to penetrate the rotor blade in the radial direction, wherein at least a part of the cooling air which has passed through the first intra-vane flow passage flow may be allowed to pass through the intra-rotor-blade flow passage.

According to this configuration, by allowing the cooling air flowing through the first intra-vane flow passage to flow through the intra-rotor-blade flow passage, the rotor blades as well as the stator vanes can be cooled. That is, it is possible to effectively cool both the stator vanes and the rotor blades using a single cooling system (the turbine-cooling system). Accordingly, it is not necessary to provide another device for cooling the rotor blades and to reduce a construction cost and a maintenance cost of the gas turbine system.

According to a ninth aspect of the invention, the gas turbine system may further include a compressor configured to rotate along with the rotation shaft thereby compressing air serving as the cooling air, and the turbine-cooling system may further include a supply flow passage configured to supply air led out from the compressor to the extra-turbine flow passage.

Here, since the rotation shaft and the rotor blades rotate relative to the casing and the stator vanes, a constant clearance is generally formed between the stator vanes and the outer circumferential surface of the rotation shaft and between the rotor blades and the inner circumferential surface of the casing. That is, a clearance is formed between the first intra-vane flow passage and the intra-rotation-shaft flow passage and between the intra-rotation-shaft flow passage and the second intra-vane flow passage. Accordingly, a part of the cooling air flows slightly into the turbine from the clearance as the cooling air flows in the turbine-cooling system. On the other hand, according to the above-mentioned configuration, the turbine-cooling system can be supplied with air led out from the compressor as cooling air. Accordingly, it is possible to keep an amount of cooling air in the turbine-cooling system normal.

According to the invention, it is possible to provide a gas turbine system that can curb a decrease in efficiency and cool a turbine.

MODES FOR CARRYING OUT THE INVENTION

First Embodiment

Figure 1:
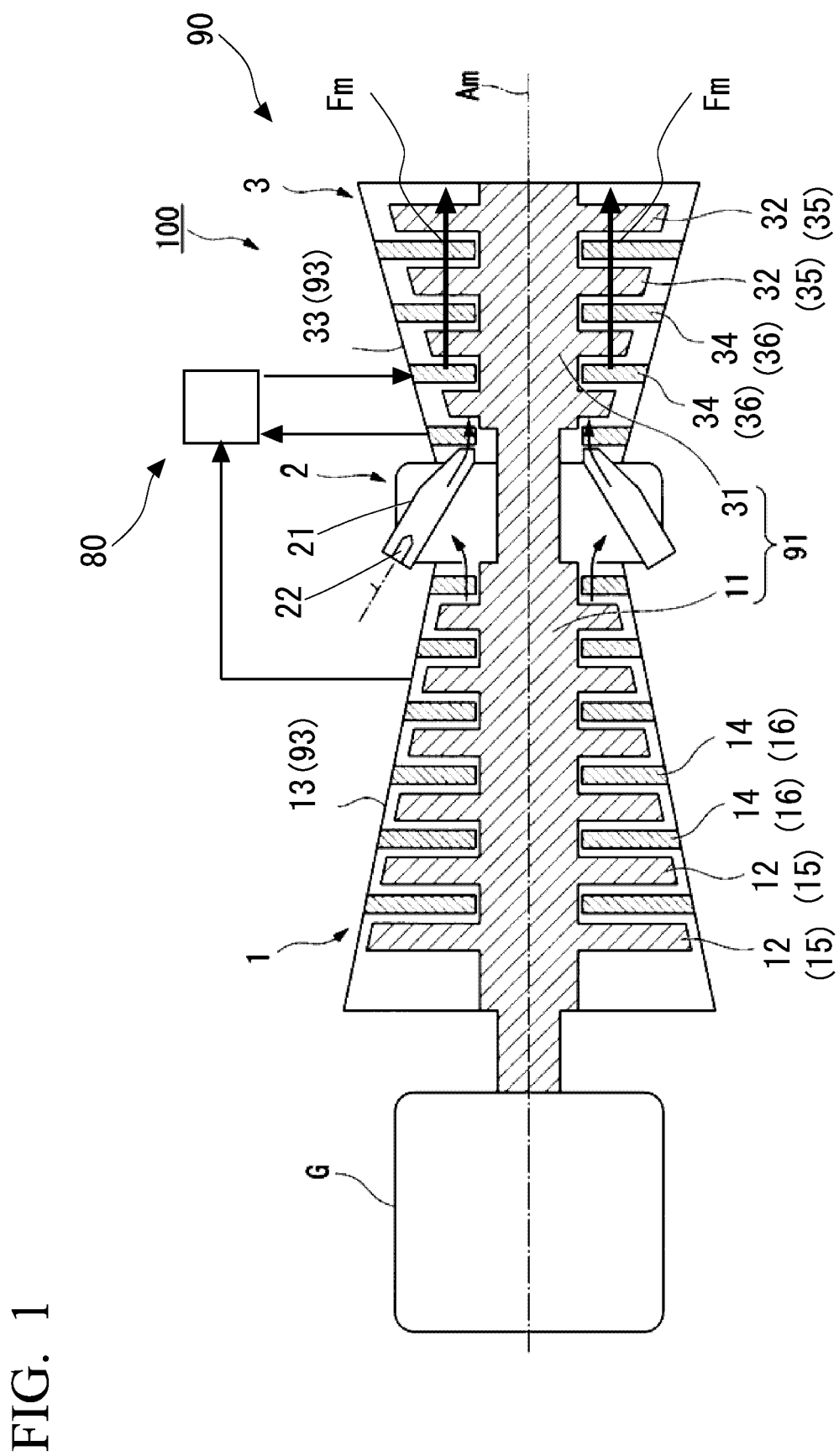
FIG. 1 is a diagram schematically illustrating a configuration of a gas turbine system according to a first embodiment of the invention.
Figure 2:
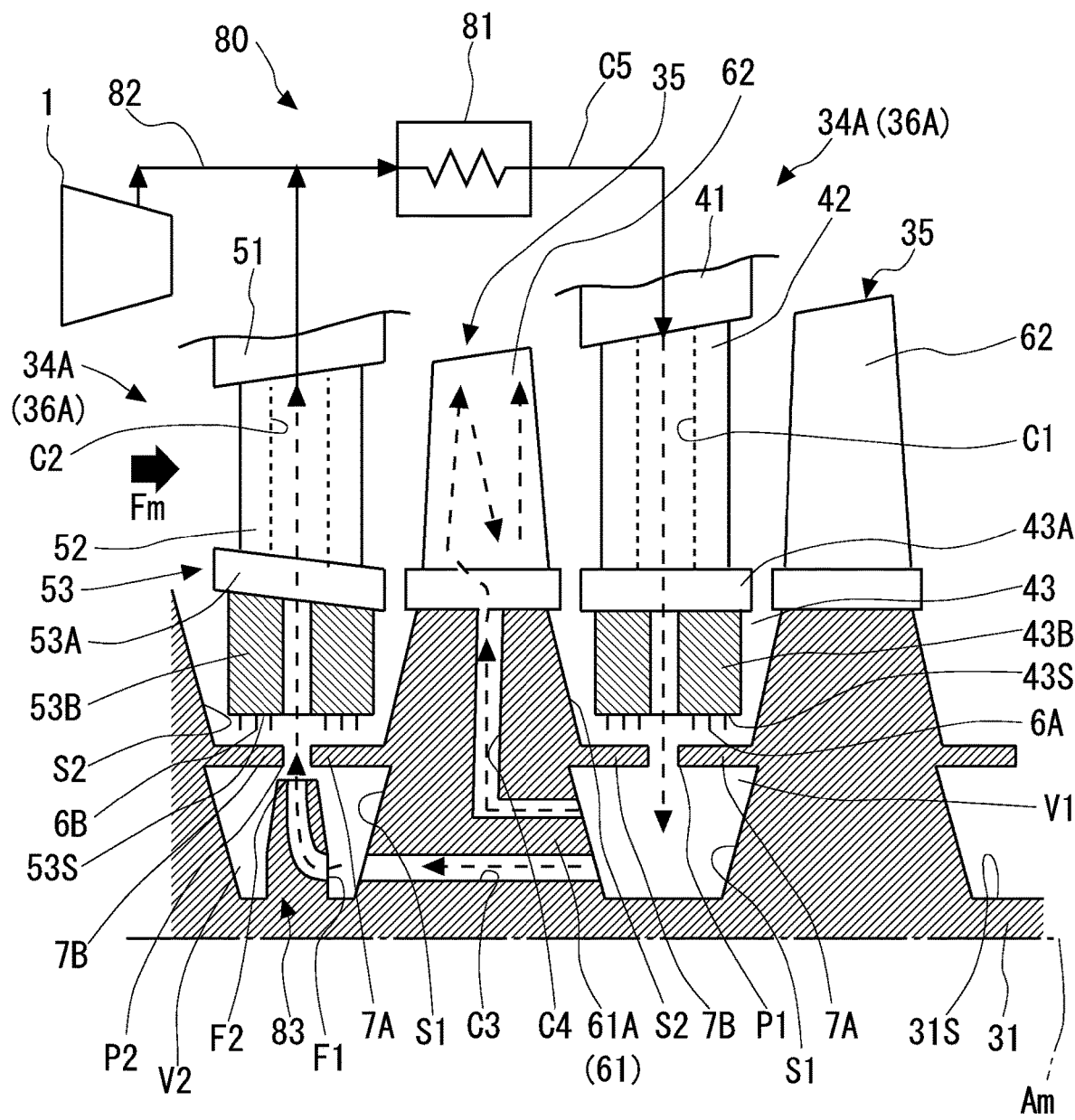
FIG. 2 is an enlarged view of a principal part of the gas turbine system according to the first embodiment of the invention.
Figure 3:
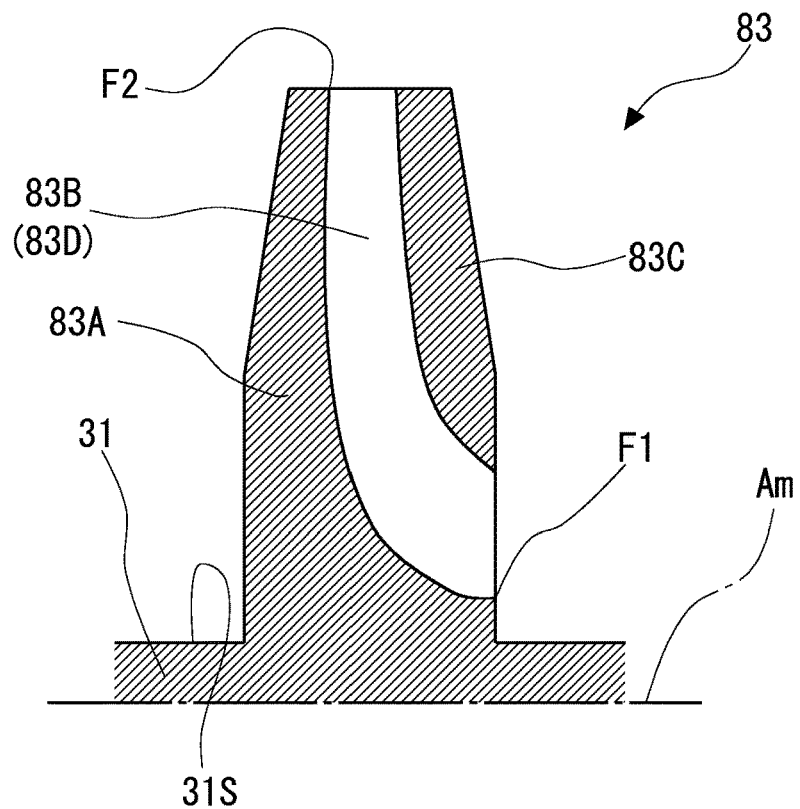
FIG. 3 is a sectional view illustrating a configuration of a boost compressor according to the first embodiment of the invention.

A first embodiment of the invention will be described with reference to FIGS. 1 to 3. A gas turbine system 100 according to this embodiment includes a gas turbine body 90 and a turbine-cooling system 80 for cooling the gas turbine body 90. As illustrated in FIG. 1, the gas turbine body 90 includes a compressor 1, a combustor 2, and a turbine 3. The compressor 1 compresses air taken from the outside and generates high-pressure compressed air. The combustor 2 generates high-temperature and high-pressure combustion gas by mixing fuel with the compressed air supplied from the compressor 1 and combusting the gas mixture. The turbine 3 is rotationally driven by the combustion gas supplied from the combustor 2. A rotational force of the turbine 3 is transmitted to a power generator G that is connected coaxially to the gas turbine body 90.

The compressor 1 includes a compressor rotor 11 that can rotate around an axis Am, a plurality of compressor rotor blade stages 12 that are arranged with intervals in the direction of the axis Am, a cylindrical compressor casing 13 covering the compressor rotor 11 and the compressor rotor blade stages 12, and a plurality of compressor stator vane stages 14 that are provided on an inner circumferential surface of the compressor casing 13. The plurality of compressor stator vane stages 14 are alternately arranged in the direction of the axis Am with the compressor rotor blade stages 12 on the inner circumferential surface of the compressor casing 13. Each compressor rotor blade stage 12 includes a plurality of compressor rotor blades 15 which are arranged with intervals in the circumferential direction of the axis Am on the outer circumferential surface of the compressor rotor 11. Each compressor stator vane stage 14 includes a plurality of compressor stator vanes 16 which are arranged with intervals in the circumferential direction of the axis Am on the inner circumferential surface of the compressor casing 13. External air taken from one side (hereinafter also referred to as upstream) in the direction of the axis Am is gradually compressed to be high-pressure compressed air by passing through the compressor rotor blade stages 12 and the compressor stator vane stages 14 while flowing to the other side (downstream) in the direction of the axis Am.

The combustor 2 includes a cylindrical combustor body 21 extending in a direction crossing the axis Am and a fuel nozzle 22 to supply fuel into the combustor body 21. A mixture gas is generated by mixing fuel with the compressed air supplied from the compressor 1 using the fuel nozzle 22. The combustor 2 generates high temperature and high-pressure combustion gas by combusting the mixture gas.

The turbine 3 includes a turbine rotor 31 (a rotation shaft) that can rotate around the axis Am, a plurality of turbine rotor blade stages 32 (rotor blade stages) that are arranged with intervals in the direction of the axis Am, a cylindrical turbine casing 33 covering the turbine rotor 31 and the turbine rotor blade stages 32, and a plurality of turbine stator vane stages 34 (stator vane stages) that are provided on the inner circumferential surface of the turbine casing 33. The plurality of turbine stator vane stages 34 are alternately arranged on the inner circumferential surface of the turbine casing 33 to alternate with the turbine rotor blade stages 32 in the direction of the axis Am. Each turbine rotor blade stage 32 includes a plurality of turbine rotor blades 35 (rotor blades) that are arranged on the outer circumferential surface of the turbine rotor 31 with intervals in the circumferential direction of the axis Am. Each turbine stator vane stage 34 includes a plurality of turbine stator vanes 36 (rotor blades) that are arranged on the inner circumferential surface of the turbine casing 33 with intervals in the circumferential direction of the axis Am. Combustion gas supplied from the combustor 2 upstream therefrom forms a flow (a main flow Fm) directed from upstream to downstream in the turbine casing 33. The main flow Fm alternately collides with the turbine rotor blade stages 32 and the turbine stator vane stages 34 while flowing from upstream to downstream. Accordingly, a rotational force is applied to the turbine rotor 31 via the turbine rotor blade stages 32.

The compressor rotor 11 and the turbine rotor 31 are connected integrally and coaxially with each other in the direction of the axis Am to form a gas turbine rotor 91 as a whole. That is, the compressor rotor 11 and the turbine rotor 3:1 rotate integrally around the axis Am. The compressor casing 13 and the turbine casing 33 are connected integrally and coaxially with each other in the direction of the axis Am to form a gas turbine casing 93 (a casing) as a whole.

The turbine-cooling system 80 cools the turbine stator vane stages 34 (the turbine stator vanes 36) and the turbine rotor blade stages 32 (the turbine rotor blades 35) and protects the turbine stator vane stages 34 and the turbine rotor blade stages 32 from heat of combustion gas flowing in the turbine 3. The detailed configuration of the turbine-cooling system 80 will be described later.

The configurations of the turbine stator vane stages 34 (the turbine stator vanes 36) and the turbine rotor blade stages 32 (the turbine rotor blades 35) will be described below with reference to FIG. 2. FIG. 2 illustrates only two turbine stator vane stages 34 and two turbine rotor blade stages 32 which are adjacent to each other out of the plurality of turbine stator vane stages 34 and the plurality of turbine rotor blade stages 32 which are arranged in the direction of the axis Am. In the following description, out of two turbine stator vane stages 34 (the turbine stator vanes 36) adjacent to each other, the turbine stator vane stage 34 (the turbine stator vane 36) on the other side (downstream) in the direction of the axis Am is referred to as a first turbine stator vane stage 34A (a first turbine stator vane 36A), and the turbine stator vane stage 34 (the turbine stator vane 36) on one side (upstream) in the direction of the axis Am is referred to as a second turbine stator vane stage 348 (a second turbine stator vane 36B).

The first turbine stator vane 36A includes a first outer shroud 41, a first turbine stator vane body 42, and a first inner shroud 43. The first outer shroud 41 is attached to the inner circumferential surface of the turbine casing 33. The first turbine stator vane body 42 extends inward in the radial direction with respect to the axis Am from the first outer shroud 41. Although details are not illustrated, the first turbine stator vane body 42 has a blade shaped section extending from upstream to downstream when seen in the radial direction with respect to the axis Am.

The first inner shroud 43 is attached to an inner end in the radial direction of the first turbine stator vane body 4 The first inner shroud 43 in a first inner shroud base 43A connected to the first turbine stator vane body 42 and a first inner shroud ring-shaped portion 43B that is integrally provided on the inner side in the radial direction of the first inner shroud base 43A. The first inner shroud ring-shaped portion 43B has a ring shape centered on the axis Am. The size of the first inner shroud ring-shaped portion 43B in the direction t the axis Am is less than the size of the first inner shroud base 43A in the direction of the axis Am. On the other hand, the size of the first inner shroud ring-shaped portion 43B in the radial direction is greater than the size of the first inner shroud base 43A in the radial direction. A plurality of seal fins 6A that are arranged with intervals in the direction of the axis Am are provided on the inner circumferential surface (a surface facing the inner side in the radial direction: a first inner circumferential surface 43S) of the first inner shroud ring-shaped portion 43B. The seal fins 6A face a platform 61 of the turbine rotor blade 35 which will be described later.

A flow passage in which cooling air supplied from the turbine-cooling system 80 which will be described later flows (a first intra-vane flow passage C1) is formed in the first outer shroud 41, the first turbine stator vane body 42, and the first inner shroud 43. The first intra-vane flow passage C1 is formed in the first outer shroud 41, the first turbine stator vane body 42, and the first shroud 43 so as to penetrate through them in the radial direction with respect to the axis Am. The configuration of the shape of a part of the first intra-vane flow passage C1 penetrating turbine stator vane body 42 is not limited to the example illustrated in FIG. 2 and can be appropriately modified depending on designs or specifications.

The second turbine stator vane 36B includes a second outer shroud a second turbine stator vane body 5 and a second inner shroud 53. The second outer shroud 51 is attached to the inner circumferential surface of the turbine casing 33. The second turbine stator vane body 52 extends in and in the radial direction with respect to the axis Am from the second outer shroud 51. Although details are not illustrated the second turbine stator vane body 52 has a blade-shaped section extending from upstream to downstream when seen in the radial direction with respect to the axis Am.

The second inner shroud 53 is attached to an inner end in the radial direction of the second turbine stator vane body 52. The second inner shroud 5 includes a second inner shroud base 53A connected to the second turbine stator vane body 52 and a second inner shroud ring-shaped portion 53B that is integrally provided on the inner side in the radial direction of the second inner shroud base 53A. The second inner shroud rind-shaped portion 53B has a ring shape centered on the axis Am. The size of the and inner shroud ring-shaped portion 53B in the direction of the axis Am is less than the size of the second inner shroud base 53A in the direction of the axis Am. On the other hand, the size of the second inner shroud ring-shaped portion 53B in the radial direction is greater than the size of the second inner shroud base 53A in the radial direction. A plurality of seal fins 6B that are arranged with intervals in the direction of the axis Am are provided on the inner circumferential surface (a surface facing the inner side in the radial direction: a second inner circumferential surface 53S) of the second inner shroud ring-shaped portion 53B. The seal fins 6B face the platform 61 of the turbine rotor blade 35 which will be described later.

A flow passage in which cooling supplied from the turbine-cooling system 80 which will be described later flows (a second inti vane flow passage C2) is formed in the second outer shroud 51, the second turbine stator vane body r the second inner shroud 53. The second intra-vane flow passage C2 is formed in the second outer shroud 51, the second turbine stator vane body 52, and the second inner shroud 53 so as to penetrate through them in the radial direction with respect to the axis Am. The configuration of the shape of a part of the second intra-vane flow passage C2 passing through the second turbine stator vane body 52 is not limited to the example illustrated in FIG. 2 and can be appropriately modified depending on designs or specifications.

The configuration of the turbine rotor blades 35 will be described below. In the following description, a plurality of turbine rotor blades 35 will be referred to by the same reference signs and the turbine rotor blade 35 disposed between the first turbine stator vane 36A and the second turbine stator vane 36B will be described. The turbine rotor blade 35 includes a platform 61 and a turbine rotor blade body 62. The platform 61 includes a platform body 61A protruding outward in the radial direction with respect to the axis Am from the outer circumferential surface of the turbine rotor 31 (the rotor outer circumferential surface 31S) and a pair of protrusions (an upstream protrusion 7A and a downstream protrusion 7B) that are provided on the surfaces of the platform body 61A facing both sides in the direction of the axis Am.

The downstream protrusion 7B protrudes to the other side (downstream) in the direction of axis Am from the surface (a downstream surface S2) facing the other side (downstream) in the direction of the axis Am in the platform body 61A. The face of the downstream protrusion 7B facing the outside in the radial direction faces the first inner shroud ring-shaped portion 43B via the seal fins 6A. Accordingly, a flow of combustion gas in the clearance between the downstream protrusion 7B and the first inner shroud ring-shaped portion 43B is sealed.

The upstream protrusion 7A protrudes to one side (upstream) in the direction of axis Am from the surface (an upstream surface S1) facing one side (upstream) in the direction of the axis Am in the platform body 61A. The face of the upstream protrusion 7A facing the outside in the radial direction faces the second inner shroud ring-shaped portion 53B via the seal fins 6B. Accordingly, a flow of combustion gas in the clearance between the upstream protrusion 7A and the second inner shroud ring-shaped portion 53B is sealed.

The downstream protrusion 7B faces the upstream protrusion 7A of another turbine rotor blade 35 adjacent downstream from the turbine rotor blade 35 with a clearance (a first communication hole P1) in the direction of the axis Am. The first communication hole P1 is formed at the same position as the first intra-vane flow passage C1 in the direction of the axis Am. A ring-shaped space (a first space V1) centered on the axis Am is formed by the downstream protrusion 7B and the upstream protrusion 7A facing each other, the rotor outer circumferential surface 31S, the downstream surface S2 of the upstream platform 61, and the upstream surface S1 of the downstream platform 61. That is, the first intra-vane flow passage C1 communicates with the first space V1 via the first communication hole P1.

The upstream protrusion 7A faces the downstream protrusion 7B of another turbine rotor blade 35 adjacent upstream from the turbine rotor blade 35 with a clearance (a second communication hole P2) in the direction of the axis Am. The second communication hole P2 is formed at the same position as the second intra-vane flow passage C2 in the direction of the axis Am. A ring-shaped space (a second space V2) centered on the axis Am is formed by the downstream protrusion 78 and the upstream protrusion 7A facing each other, the rotor outer circumferential surface 31S, the downstream surface S2 of the upstream platform 61, and the upstream surface S1 of the downstream platform 61. That is, the second intra-vane flow passage C2 communicates with the second space V2 via the second communication hole P2.

Two flow passages (an intra-rotation-shaft flow passage C3 and an intra-rotor-blade flow passage C4) are formed in the platform body 61A. The intra-rotation-shaft flow passage C3 is formed in the platform body 61A so as to penetrate therethrough in the direction of the axis Am. That is, one end of the intra-rotation-shaft flow passage C3 is open on the downstream surface S2 of the platform body 61A and the other end thereof is open on the upstream surface S1 of the platform body 61A. The first space V1 and the second space V2 communicate with each other via the intra-rotation-shaft flow passage C3. The intra-rotor-blade flow passage C4 is formed on the outer side in the radial direction of the intra-rotation-shaft flow passage C3. One end of the intra-rotor-blade flow passage C4 is open on the downstream surface S2 of the platform body 61A. The other end of the intra-rotor-blade flow passage C4 is open on the surface of the turbine rotor blade body 62. That is, the intra-rotor-blade flow passage C4 extends upstream (to one side in the direction of the axis Am) from one end thereof and then extends outward in the radial direction with the direction changed. The intra-rotor-blade flow passage C4 is formed to protect the turbine rotor blade 35 from heat of combustion gas by allowing cooling air to flow therein. The configuration of the shape of a part of the intra-rotor-blade flow passage C4 penetrating the turbine rotor blade body 62 is not limited to the example illustrated in FIG. 2 and can be appropriately modified depending on designs or specifications.

The configuration of the turbine-cooling system 80 will be described below. The turbine-cooling system 80 includes the first intra-vane flow passage C1, the intra-rotation-shaft flow passage C3, the second intra-vane flow passage C2, an extra-turbine flow passage C5, a cooling unit 81, a supply flow passage 82, a boost compressor 83, and the intra-rotor-blade flow passage C4. The extra turbine flow passage C5 connects an inlet (an outer end in the radial direction) of the first intra-vane flow passage C1 and an outlet (an outer end in the radial direction) of the second intra-vane flow passage C2. The cooling unit 81 generating cooling air by cooling air flowing in the extra-turbine flow passage C5 is provided in the extra-turbine flow passage C5. The cooling unit 81 performs heat exchange between a cooling medium with a relatively low temperature supplied from the outside and air in the extra-turbine flow passage C5.

The supply flow passage 82 is connected to the extra-turbine flow passage C5. The supply flow passage 82 connects the extra-turbine flow passage C5 and the compressor 1. More specifically, one end of the supply flow passage 82 is connected to a compression stage at an intermediate position in the upstream-downstream direction out of a plurality of compression stages in the compressor 1. That is, air led out from the compressor 1 flows in the supply flow passage 82. The air from the compressor is intermediate-pressure air with a lower pressure than the compressed air discharged from an outlet (most downstream) of the compressor 1. Here, a compression stage refers to a constituent unit which is formed by one compressor rotor blade stage 12 and one compressor stator vane stage 14 adjacent to each other. In this embodiment, the compressor 1 is used as an air source to the supply flow passage 82 and another device other than the compressor 1 may be used as an air source.

The boost, compressor 83 causes cooling air to flow sequentially through the first intra-vane flow passage C1, the intra-rotation-shaft flow passage C3, the second intra-vane flow passage C2, and the extra-turbine flow passage C5. The boost compressor 83 is provided integrally with the turbine rotor 31 in the second space V2. Specifically, as illustrated in FIG. 3, the boost compressor 83 includes an impeller disk 83A, a plurality of blades 83B, and an impeller cover 83C. The impeller disk 83A has a disk shape centered on the axis Am. A plurality of blades 83B that are arranged radially centered on the axis Am are provided on a surface of the impeller disk 83A facing the other side (downstream) in the direction of the axis Am. Each blade 83B is gradually curved from one side to the other side in the circumferential direction as it extends from inside to outside in the radial direction with respect to the axis Am. The blades 83B are covered with the impeller cover 83C from the other side (downstream) in the direction of the axis Am. A space surrounded with the impeller cover 83C, the impeller disk 83A, and a pair of blades 83B adjacent to each other forms an impeller flow passage 83D. The impeller flow passage 83D is gradually curved from inside to outside in the radial direction as it progresses from the other side (downstream) to one side (upstream) in the direction of the axis Am. As illustrated in FIG. 2, an inlet of the impeller flow passage 83D (the other end in the direction of the axis Am: an impeller inlet F1) is open at the same position as the intra-rotation-shaft flow passage C3 in the radial direction with respect to the axis Am. The outlet of the impeller flow passage 83D (an outer end in the radial direction; an impeller outlet F2) is open at the same position as the second communication hole P2 in the direction of the axis Am.

The operation of the gas turbine system 100 according to this embodiment will be described below. In operating the gas turbine system 100, the compressor 1 of the gas turbine body 90 is first driven by an external drive source (an electric motor). When the compressor 1 is driven, high-pressure compressed air is generated. The combustor 2 generates high-temperature and high-pressure combustion gas by mixing fuel with the compressed air and combusting the mixture gas. The combustion gas is supplied to the turbine 3. A flow of the combustion gas (a main flow Fm) is repeatedly subjected to rectification by the turbine stator vane stages 34 and collision with the turbine rotor blade stages 32 while flowing from upstream to downstream. When combustion gas collides with the turbine rotor blade stages 32, a rotational force is applied to the turbine rotor 31. Rotation of the turbine rotor 31 is extracted from a shaft end and is used to drive the power generator.

In the gas turbine, as the temperature of combustion gas at the inlet of the turbine 3 (an inlet temperature of the turbine 3) increases, efficiency thereof increases. In order to achieve an increase in efficiency, an additional increase of the inlet temperature of the turbine 3 is intended. In addition, it is necessary to further enhance cooling capability for the turbine 3. Therefore, in this embodiment, a configuration in which cooling air is supplied to the turbine stator vane stages 34 and the turbine rotor blade stages 32 by the turbine-cooling system 80 is employed. More specifically, with rotation of the turbine rotor 31, the boost compressor 83 rotates. With rotation of the boost compressor 83, the pressure of cooling air in the second space V2 is increased and the cooling air flows into the second intra-vane flow passage C2 via the second communication hole P2. When cooling air flows in the second intra-vane flow passage C2, the second turbine stator vane body 52 is cooled. The cooling air flowing out of the second intra-vane flow passage C2 becomes a relatively low temperature by heat exchange in the cooling unit 81 while flowing through the extra-turbine flow passage C5. The cooling air with a low temperature flows into the first intra-vane flow passage C1 from the extra-turbine flow passage C5. When the cooling air flows in the first intra-vane flow passage C1, the first turbine stator vane body 42 is cooled. The cooling air flowing out of the first intra-vane flow passage C1 flows into the first space V1 via the first communication hole P1. A part of the cooling air flowing into the first space V1 flows from downstream to upstream via the intra-rotation-shaft flow passage C3 and reaches the second space V2 again.

On the other hand, the residual of the cooling air flowing into the first space V1 flows in the intra-rotor-blade flow passage C4 to cool the turbine rotor blade body 62. After cooling the turbine rotor blade body 62, the cooling air is discharged to the main flow Fm. That is, in the turbine-cooling system 80, the cooling air circulates sequentially through the first intra-vane flow passage C1, the intra-rotation-shaft flow passage C3, the boost compressor 83, the second intra-vane flow passage C2, and the extra-turbine flow passage C5. On the other hand, as the cooling air is distributed to the intra-rotor-blade flow passage C4, the flow rate of the cooling air decreases. The decreased cooling air is complemented from the compressor 1 serving as the air source via the supply flow passage 82. That is, in the turbine-cooling system 80, since the pressure required for flowing of the cooling air is generated by only the boost compressor 83, a high pressure is not required for bleeding of the cooling air supplied via the supply flow passage 82 from the compressor 1. Accordingly, in this embodiment, the above-mentioned configuration in which air is led out from an intermediate compression stage of the compressor 1 is employed.

As described above, with the configuration according to this embodiment, the turbine-cooling system 80 includes the first intra-vane flow passage C1, the intra-rotation-shaft flow passage C3, the second intra-vane flow passage C2, the extra-turbine flow passage C5, the boost compressor 83 that makes cooling air flow through the flow passages, and the cooling unit 81 for cooling the cooling air. When the cooling air flows through the first intra-vane flow passage C1 and the second intra-vane flow passage C2, the turbine stator vanes 36 are cooled. The cooling air is circulated through the first intra-vane flow passage C1, the intra-rotation-shaft flow passage C3, the second intra-vane flow passage C2, and the extra-turbine flow passage C5 by the boost compressor 83. Accordingly, by appropriately setting the compression ratio of the boost compressor 83, it is possible to suppress a pressure difference between the cooling air and the combustion gas. As a result, it is possible to curb leakage of cooling air into the combustion gas and to improve heat efficiency.

With the above-mentioned configuration, the first intra-vane flow passage C1 and the second intra-vane flow passage C2 are formed in different turbine stator vane stages 34 (turbine stator vanes 36). Accordingly, it is possible to cool more stator vane stages 34 using a single turbine-cooling system 80. As a result, since the number of components and the number of assembly processes in the gas turbine system 100 are reduced, it is possible to achieve a decrease in cost.

Here, the pressure of the combustion gas decreases gradually from upstream to downstream in the direction of the main flow Fm in the turbine 3. In the above-mentioned configuration, the first intra-vane flow passage C1 is formed in the first turbine stator vane stage 34A with a relatively low pressure on the downstream side, and the second intra-vane flow passage C2 is formed in the second turbine stator vane stage 34B with a relatively high pressure on the upstream side. The boost compressor 83 is provided between the intra-rotation-shaft flow passage C3 and the second intra-vane flow passage C2, that is, downstream from the first intra-vane flow passage C1. Accordingly, cooling air with a relatively low pressure can be supplied to the first intra-vane flow passage C1 and cooling air with a relatively high pressure which has been boosted by the boost compressor 83 can be supplied to the second intra-vane flow passage C2. As a result, it is possible to decrease the pressure difference between the main flow Fm (the combustion gas) and the cooling air in both the first intra-vane flow passage C1 and the second intra-vane flow passage C2 and to further reduce the likelihood that the cooling air will leak to the main flow Fm. Particularly, it is possible to reduce leakage of the cooling air from the clearance between the upstream protrusion 7A and the downstream protrusion 7B and the first inner circumferential surface 43S (the second inner circumferential surface 53S).

On the other hand, for example, when the first intra-vane flow passage C1 is formed in the turbine stator vane stage 34 which is relatively upstream, it is necessary to supply cooling air with a higher pressure than the main flow Fm (the combustion gas) to the first intra-vane flow passage C1 in order to prevent a back flow of the main flow Fm into the first intra-vane flow passage C1. The cooling air with a high pressure is supplied to the second intra-vane flow passage C2. As a result, there is the likelihood that cooling air will leak to the main flow Fm from the second intra-vane flow passage C2 and thermal efficiency of the turbine 3 will decrease. Since the cooling air having increased in temperature at the time of cooling the upstream turbine stator vane stage 34 is supplied to the downstream turbine stator vane stage 34 with a relatively low temperature, there is concern that a cooling effect will also decrease. However, with the above-mentioned configuration, this situation can be avoided.

With the above-mentioned configuration, since the boost compressor 83 is provided integrally with the rotation shaft, it is possible to save space for device installation, for example, in comparison with a case in which the boost compressor 83 is provided on the outside independently from the turbine 3. Since the boost compressor 83 is driven coaxially with the turbine 3, power required for driving the boost compressor 83 can also be reduced. The boost compressor 83 boosts the pressure of cooling air supplied from the outlet of the intra-rotation-shaft flow passage C3 and supplies the boosted cooling air to the second intra-vane flow passage C2. Here, the cooling air supplied from the intra-rotation-shaft flow passage C3 decreases in pressure at the time of passing through the first intra-vane flow passage C1. However, with the above-mentioned configuration, the cooling air can be supplied to the second intra-vane flow passage C2 in a state in which the pressure of the cooling air has been boosted by the boost compressor 83. That is, it is possible to promote flowing of the cooling air in the second intra-vane flow passage C2.

In addition, with the above-mentioned configuration, by allowing the cooling air flowing through the first Intra-vane flow passage C1 to flow through the intra-rotor-blade flow passage C4, the turbine rotor blades 35 as well as the turbine stator vanes 36 can be cooled. That is, it is possible to effectively cool both the turbine stator vanes 36 and the turbine rotor blades 35 using a single cooling system (the turbine-cooling system 80). Accordingly, it is not necessary to provide another device for cooling the turbine rotor blades 35 and to reduce a construction cost and a maintenance cost of the gas turbine system 100.

Here, since the turbine rotor 31 and the turbine rotor blades 35 rotate relative to the turbine casing 33 and the turbine stator vanes 36, a constant clearance is generally formed between the turbine stator vanes 36 and the rotor outer circumferential surface 31S and between the turbine rotor blades 35 and the inner circumferential surface of the turbine casing 33. That is, a clearance is formed between the first intra-vane flow passage C1 and the intra-rotation-shaft flow passage C3 and between the intra-rotation-shaft flow passage C3 and the second intra-vane flow passage C2. Accordingly, a part of the cooling air flows slightly into the main flow Fm from the clearance as the cooling air flows in the turbine-cooling system 80. As a result, there is concern that the flow rate of the cooling air will decrease and the cooling effect will deteriorate gradually. However, with the above-mentioned configuration, air led out from the compressor 1 can be complemented as cooling air. Accordingly, it is possible to keep an amount of cooling air in the turbine-cooling system 80 normal. The air led out from the compressor 1 has a lower pressure than air discharged from the outlet of the compressor 1. Accordingly, the pressure of the cooling air does not increase greatly due to introduction of the led out air into the turbine-cooling system 80.

Figure 4:
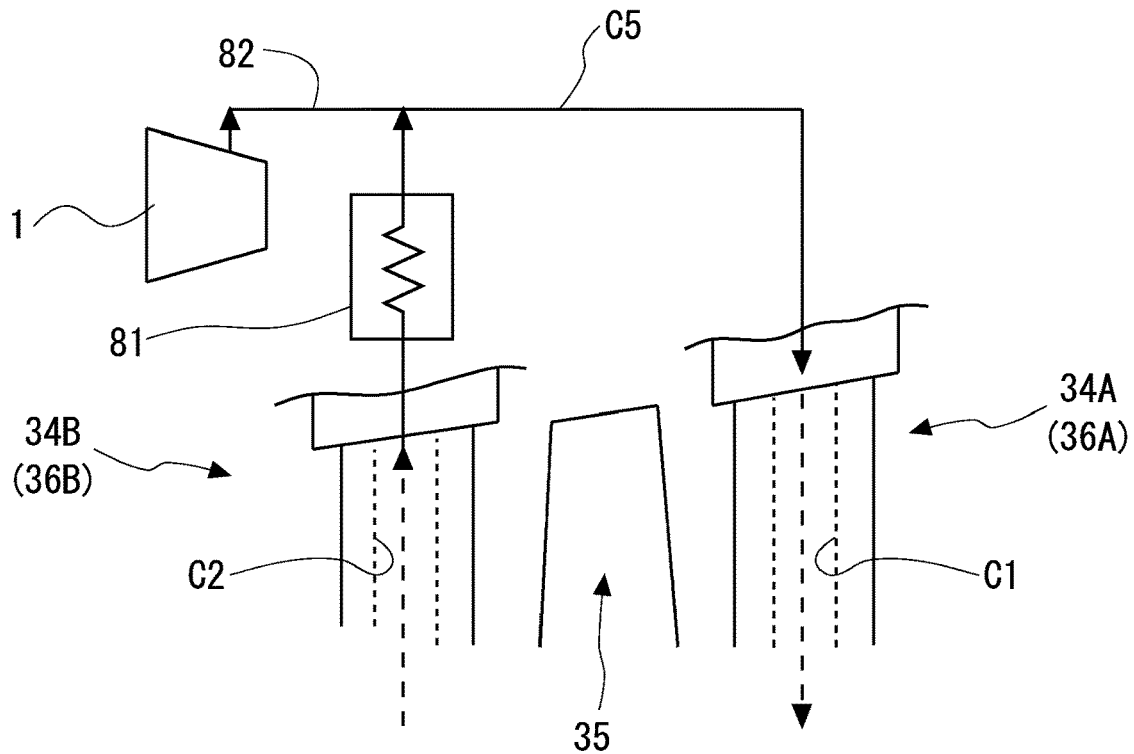
FIG. 4 is a diagram schematically illustrating a modified example of the gas turbine system according to the first embodiment of the invention.

The first embodiment of the invention has been described above. The above-mentioned configuration can be subjected to various modifications or improvements without departing from the gist of the invention. For example, in the first embodiment, the supply flow passage 82 is connected to an upstream side of the cooling unit 81 in the extra-turbine flow passage C5. However, the aspect of the supply flow passage 82 is not limited to the above-mentioned configuration and, for example, the configuration illustrated in FIG. 4 may be employed. In the example illustrated in the drawing, the supply flow passage 82 is connected to a downstream side of the cooling unit 81 in the extra-turbine flow passage C5. With this configuration, it is also possible to obtain the same operations and advantages as in the above-mentioned embodiment.

Figure 5:
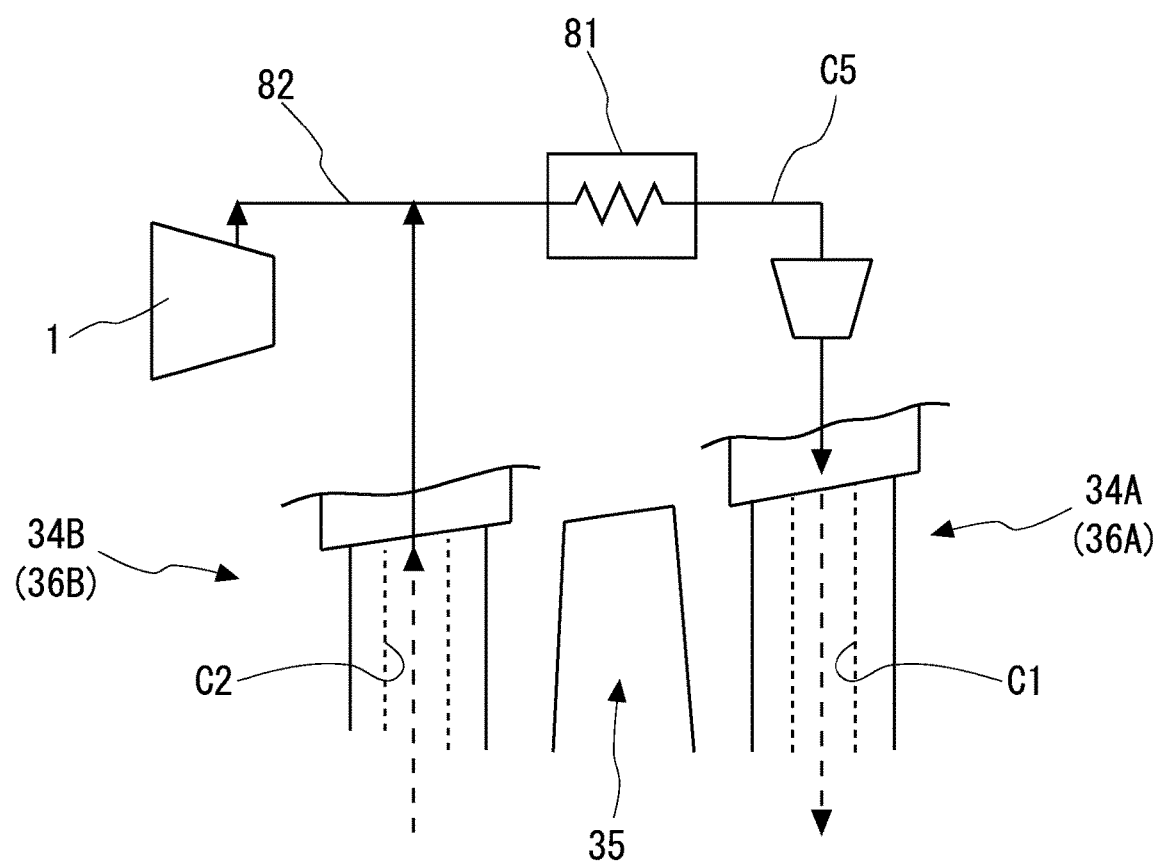
FIG. 5 is a diagram schematically illustrating another modified example of the gas turbine system according to the first embodiment of the invention.

In the above-mentioned embodiment, the boost compressor 83 is provided integrally with the turbine rotor 31. However, the aspect of the boost compressor 83 is not limited to the above-mentioned configuration and, for example, the configuration illustrated in FIG. 5 may be employed. In the example illustrated in the drawing, a boost compressor 283 is provided in the extra-turbine flow passage C5 instead of the turbine rotor 31. The boost compressor 283 is driven by an external drive source (not illustrated). With this configuration, an output of the boost compressor 283 can be changed independently from a rotation speed (an output) of the gas turbine body 90. Accordingly, it is possible to more precisely adjust the pressure of cooling air which is supplied to the cooling system of the turbine 3 or the like. As a result, it is possible to further reduce the pressure difference between the main flow Fm and the cooling air and to further reduce leakage of the cooling air into the main flow Fm.

Second Embodiment

Figure 6:
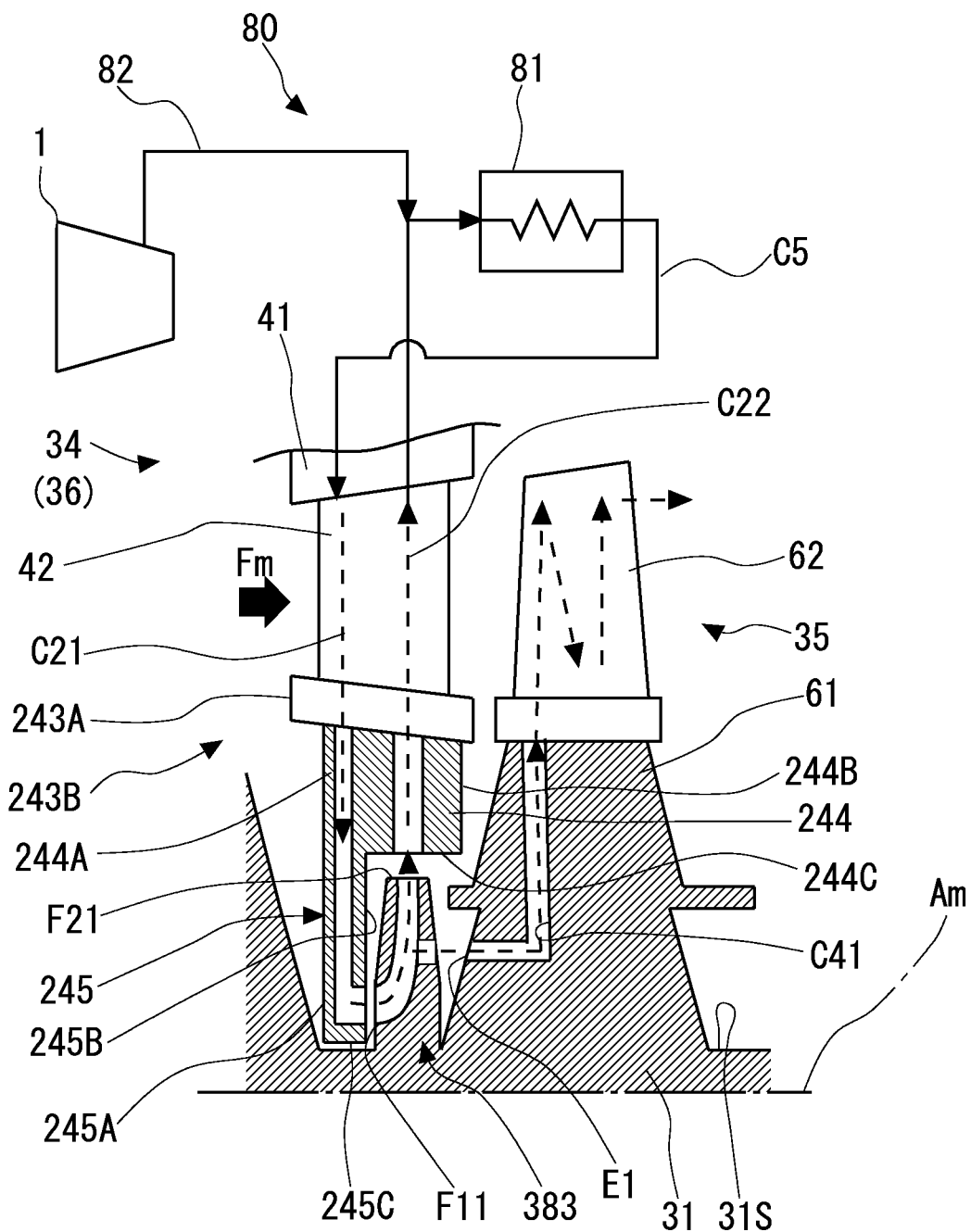
FIG. 6 is a diagram schematically illustrating a configuration of a gas turbine system according to a second embodiment of the invention.

A second embodiment of the invention will be described below with reference to FIGS. 6 and 7. The same elements as in the first embodiment will be referred to by the same reference signs and detailed description thereof will not be repeated. As illustrated in FIG. 6, in this embodiment, the shape of an inner shroud ring-shaped portion 243B of each turbine stator vane 36 is different from that in the first embodiment. The inner shroud ring-shaped portion 243B includes a ring-shaped body 244 that is attached to the inner part in the radial direction of an inner shroud base portion 243A and forms a ring shape centered on the axis Am and a ring-shaped extension 245 protruding inward in the radial direction from the inner circumferential surface of the ring-shaped body 244. A surface of the extension 245 facing one side (upstream) in the direction of the axis Am (an extension upstream surface 245A) is flush with a surface of the ring-shaped body 244 facing one side (upstream) in the direction of the axis Am (a body upstream surface 244A). The size of the extension 245 in the direction of the axis Am is less than the size of the ring-shaped body 244 in the direction of the axis Am. That is, a surface of the extension 245 facing the other side (downstream) in the direction of the axis Am (an extension downstream surface 245B) and a surface of the ring-shaped body 244 facing the other side (downstream) in the direction of the axis Am (a body downstream surface 244B) are different from each other in position in the direction of the axis Am. An end surface on the inner side in the radial direction of the extension 245 (an intra-extension circumferential surface 245C) faces the rotor outer circumferential surface 31S with a gap in the radial direction.

In this embodiment, a first intra-vane flow passage C21 and a second intra-vane flow passage C22 are formed in the same turbine stator vane stage 34 (the same turbine stator vane 36). The first intra-vane flow passage C21 is formed in the extension 245, the ring-shaped body 244, and the turbine stator vane 36 so as to penetrate through them in the radial direction with respect to the axis Am. An inner end in the radial direction of the first intra-vane flow passage C21 is open on the extension downstream surface 245B. The second intra-vane flow passage C22 is formed the ring-shaped body 244 and the turbine stator vane 36 so as to penetrate through them in the radial direction with respect to the axis Am. An inner end in the radial direction of the second intra-vane flow passage C22 is open on the inner circumferential surface of the ring-shaped body 244 (the body inner circumferential surface 244C). That is, the first intra-vane flow passage C21 is formed upstream from the second intra-vane flow passage C22.

A boost compressor 383 is provided between the ring-shaped body 244 and the rotor outer circumferential surface 31S on the other side (downstream) in the direction of the axis Am from the extension 245. As illustrated in FIG. 7, the boost compressor 383 includes an impeller disk 383A, a plurality of blades 383B, and an impeller cover 383C similarly to the boost compressor 83 described in the first embodiment. An impeller flow passage 383D is formed between the impeller disk 383A and the impeller cover 383C. The impeller flow passage 383D is gradually curved from inside to outside in the radial direction as it progresses from one side to the other side in the direction of the axis Am. As illustrated in FIG. 6, an end on one side in the direction of the axis Am of the impeller flow passage 383D (an impeller inlet F11) is formed at the same position in the radial direction as an inner end in the radial direction of the first intra-vane flow passage C21. An end on the other side in the radial direction of the impeller flow passage 383D (an impeller outlet F21) is formed at the same position in the direction of the axis Am as the inner end in the radial direction of the second intra-vane flow passage C22.

Figure 7:
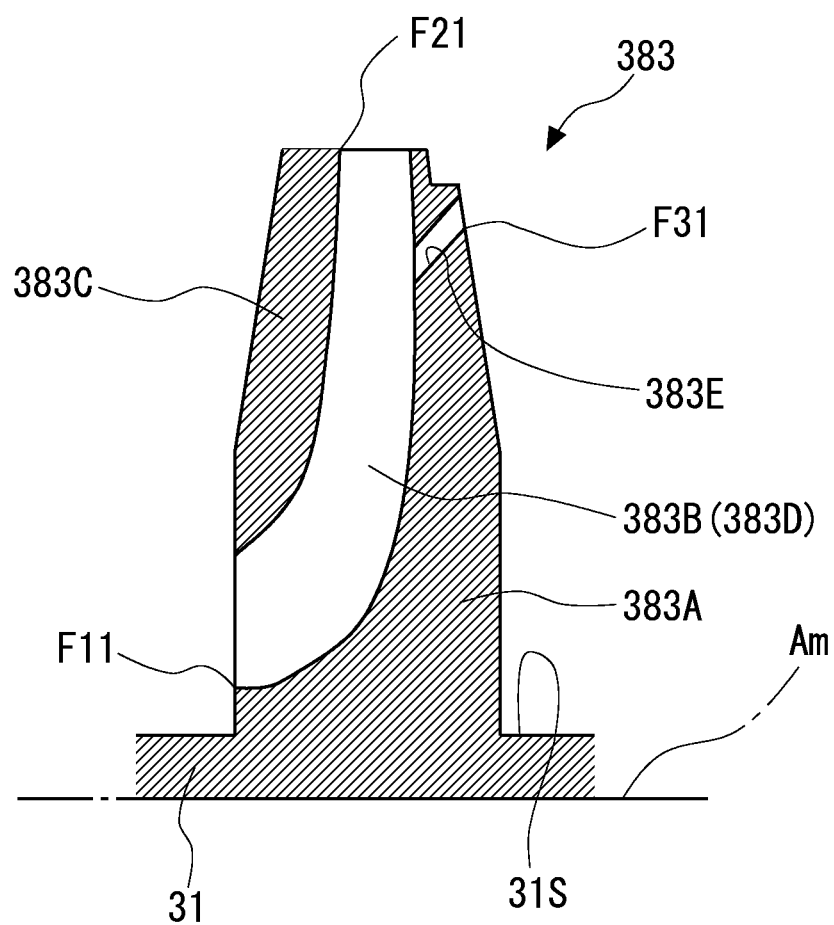
FIG. 7 is a sectional view illustrating a configuration of a boost compressor according to the second embodiment of the invention.

As illustrated in FIG. 7, a flow passage (a branch flow passage 383E) extending in a direction crossing the axis Am is formed in the impeller disk 383A of the boost compressor 383. One end of the branch flow passage 383E is open at an intermediate position in the radial direction in the impeller flow passage 383D. The other end of the branch flow passage 383E (a branch flow passage outlet F31) is open to the other side (downstream) in the direction of the axis Am of the impeller disk 383A. The branch flow passage 383E extends from inside to outside in the radial direction as it progresses from upstream to downstream.

As illustrated in FIG. 6, in this embodiment, the configuration and the shape of an intra-rotor-blade flow passage C41 are different from those in the first embodiment. One end of the intra-rotor-blade flow passage C41 (an intra-rotor-blade flow passage inlet E1) is formed at the same position in the radial direction as the branch flow passage outlet F31. The other end of the intra-rotor-blade flow passage C41 is open on the surface of the turbine rotor blade body 62.

In the above-mentioned configuration, with the operation of the turbine-cooling system 80, cooling air is supplied to the first intra-vane flow passage C21. When the cooling air flows through the first intra-vane flow passage C21, at least a part of the turbine stator vane 36 is cooled. The cooling air flowing through the first intra-vane flow passage C21 is boosted in pressure by the boost compressor 383 and flows into the second intra-vane flow passage C22. When the cooling air flows through the second intra-vane flow passage C22, the residual part of the turbine stator vane 36 is cooled. The cooling air flowing out of the second intra-vane flow passage C22 flows into the extra-turbine flow passage C5, and becomes a relatively low temperature by heat exchange in the cooling unit 81. The cooling air with a low temperature flows into the first intra-vane flow passage C21 again. A part of the cooling air boosted in pressure by the boost compressor 383 flows into the intra-rotor-blade flow passage C41 via the branch flow passage 383E.

As described above, with the configuration according to this embodiment, since the first intra-vane flow passage C21 and the second intra-vane flow passage C22 are formed in the same turbine stator vane stage 34 (the same turbine stator vane 36), it is possible to decrease the pressure required for allowing the cooling air to flow from the first intra-vane flow passage C21 to the second intra-vane flow passage C22, for example, in comparison with a case in which the flow passages are formed in different turbine stator vane stages 34 (turbine stator vanes 36). That is, since the compression ratio of the boost compressor 383 can be decreased, it is possible to reduce power required for driving the boost compressor 383. Since the compression ratio of the boost compressor 383 is decreased, the pressure difference between the cooling air and the main flow Fm (the combustion gas) further decreases. Accordingly, it is possible to reduce the likelihood that the cooling air will leak to the main flow Fm.

By cooling the same turbine stator vane stage 34 (the same turbine stator vane 36) using two flow passages (the first intra-vane flow passage C21 and the second intra-vane flow passage C22), it is possible to decrease a cooling load for each flow passage. Particularly, by decreasing the cooling load of the first intra-vane flow passage C21, for example, a part of the cooling air flowing through the first intra-vane flow passage C21 can be extracted and be used for cooling other constituent members. In this embodiment, the adjacent turbine rotor blade 35 is cooled by supplying a part of the cooling air to the turbine rotor blade 35 via the branch flow passage 383E. Accordingly, with the above-mentioned configuration, it is possible to cool a wider range in the turbine 3.

In addition, with the above-mentioned configuration, since the boost compressor 383 is provided integrally with the turbine rotor 31, it is possible to save space for device installation, for example, in comparison with a case in which the boost compressor 383 is provided on the outside independently from the turbine 3. Since the boost compressor 383 is driven coaxially with the turbine 3, power required for driving the boost compressor 383 can also be reduced. The boost compressor 383 can boost the pressure of the cooling air which has relatively decreased in pressure while passing through the first intra-vane flow passage C21 and supply the boosted cooling air to the second intra-vane flow passage C22. Accordingly, it is possible to promote flowing of the cooling air in the second intra-vane flow passage C22.

The second embodiment of the invention has been described above. The above-mentioned configuration can be subjected to various modifications or improvements without departing from the gist of the invention. For example, the configurations illustrated in FIGS. 4 and 5 and described above in the modified example of the first embodiment can also be applied to the gas turbine system 100 according to this embodiment. The turbine-cooling system 80 according to this embodiment can also be provided in each pair of the turbine stator vane 36 and the turbine rotor blade 35 adjacent to each other.

EXPLANATION OF REFERENCES

1 ... Compressor
2 ... Combustor
3 ... Turbine
6A, 6B ... Seal fin
11 ... Compressor rotor
12 ... Compressor rotor blade stage
13 ... Compressor casing
14 ... Compressor stator vane stage
15 ... Compressor rotor blade
16 ... Compressor stator vane
21 ... Combustor body
22 ... Fuel nozzle
31 ... Turbine rotor
32 ... Turbine rotor blade stage
33 ... Turbine casing
34 ... Turbine stator vane stage
35 ... Turbine rotor blade
36 ... Turbine stator vane
41 ... First outer shroud
42 ... First turbine stator vane body
43 ... First inner shroud
51 ... Second outer shroud
52 ... Second turbine stator vane body
53 ... Second inner shroud
61 ... Platform
62 ... Turbine rotor blade body
80 ... Turbine-cooling system
81 ... Cooling unit
82 ... Supply flow passage
83 ... Boost compressor
90 ... Gas turbine body
91 ... Gas turbine rotor
93 ... Gas turbine casing
100 ... Gas turbine system
244 ... Ring-shaped body
245 ... Extension
283 ... Boost compressor
383 ... Boost compressor
243A ... Inner shroud base
243B ... Inner shroud ring-shaped portion
244A ... Body upstream surface
244B ... Body downstream surface
244C ... Body inner circumferential surface
245A ... Extension upstream surface
245B ... Extension downstream surface
245C ... Extension inner circumferential surface
315 ... Rotor outer circumferential surface
34A ... First turbine stator vane stage
34B ... Second turbine stator vane stage
36A ... First turbine stator vane
36B ... Second turbine stator vane
383A ... Impeller disk
383B ... Blade
383C ... Impeller cover
383C ... Impeller flow passage
383E ... Branch flow passage
43A ... First inner shroud base
43B ... First inner shroud ring-shaped portion
43S ... First inner circumferential surface
53A ... Second inner shroud base
53B ... Second inner shroud ring-shaped portion
535 ... Second inner circumferential surface
61A ... Platform body
7A ... Upstream protrusion
7B ... Downstream protrusion
83A ... Impeller disk
83B ... Blade
83C ... Impeller cover
83D ... Impeller flow passage
Am ... Axis
C1 ... First intra-vane flow passage
C2 ... Second intra-vane flow passage
C21 ... First intra-vane flow passage
C22 ... Second intra-vane flow passage
C3 ... Intra-rotation-shaft flow passage
C4 ... Intra-rotor-blade flow passage
C41 ... Intra-rotor-blade flow passage
C5 ... Extra-turbine flow passage
E1 ... Intra-rotor-blade flow passage inlet
F1 ... Impeller inlet
F11 ... Impeller inlet
F2 ... Impeller outlet
F21 ... Impeller outlet
F31 ... Branch flow passage outlet
Fm ... Main flow
P1 ... First communication hole
P2 ... Second communication hole
51 ... Upstream surface
52 ... Downstream surface
V1 ... First space
V2 ... Second space

What is claimed is:

1. A gas turbine system, comprising:
a turbine including
a rotation shaft configured to rotate around an axis defining a circumferential direction and a radial direction,
a rotor blade stage including a plurality of rotor blades arranged on an outer circumference of the rotation shaft with intervals in the circumferential direction,
a casing surrounding the rotation shaft and the plurality of rotor blades, and
a plurality of stator vane stages, each including a plurality of stator vanes fixed to the casing and arranged with intervals in the circumferential direction; and
a turbine-cooling system configured to cool the turbine with cooling air,
wherein the turbine-cooling system includes
a first intra-vane flow passage that is defined in a first vane of a first vane stage of the plurality of stator vane stages so as to penetrate the first vane in the radial direction,
a second intra-vane flow passage that is defined in a second vane of a second vane stage of the plurality of stator vane stages so as to penetrate the second vane in the radial direction,
an intra-rotation-shaft flow passage that is defined in the rotation shaft and connects an inner end in the radial direction of the first intra-vane flow passage and an inner end in the radial direction of the second intra-vane flow passage,
an extra-turbine flow passage connecting an outer end in the radial direction of the first intra-vane flow passage and an outer end in the radial direction of the second intra-vane flow passage, and
a boost compressor configured to make the cooling air flow sequentially through the first intra-vane flow passage, the intra-rotation-shaft flow passage, the second intra-vane flow passage, and the extra-turbine flow passage, wherein the boost compressor includes an impeller disk that is centered on the axis and integral with the rotation shaft such that the impeller disk protrudes directly radially outward from the rotation shaft, wherein an inlet of the boost compressor faces downstream in a main flow direction of the turbine, and wherein the boost compressor is between the intra-rotation-shaft flow passage and the second intra-vane flow passage.

2. The gas turbine system according to claim 1, wherein the turbine-cooling system further includes:

a cooling unit that is in the extra-turbine flow passage and configured to cool the cooling air.

3. The gas turbine system according to claim 1, wherein the boost compressor further includes:

a plurality of blades radially centered on the axis on a surface of the impeller disk facing downstream in the main flow direction; and an impeller cover covering the plurality of blades and defining an impeller flow passage between the impeller disk and the impeller cover, wherein the inlet of the boost compressor which is an inlet of the impeller flow passage is open to an outlet of the intra-rotation-shaft flow passage and an outlet of the impeller flow passage is open to an inlet of the second intra-vane flow passage.

4. The gas turbine system according to claim 1, wherein an intra-rotor-blade flow passage is defined in one blade of the plurality of rotor blades so as to penetrate the one blade of the plurality of rotor blades in the radial direction for allowing at least a part of the cooling air which has passed through the first intra-vane flow passage flow to pass through the intra-rotor-blade flow passage.

5. The gas turbine system according to claim 1, further comprising a compressor configured to rotate along with the rotation shaft so as to compress air, wherein the turbine-cooling system further includes a supply flow passage configured to supply the air from the compressor to the extra-turbine flow passage.

* * * * *